(12) United States Patent
Woods

(10) Patent No.: US 11,759,743 B2
(45) Date of Patent: Sep. 19, 2023

(54) ELEVATORS AND OUTDOOR INTAKE HEPA FILTRATION SYSTEMS

(71) Applicant: AMAIRCAIR CORPORATION, Mississauga (CA)

(72) Inventor: Jim Woods, Mississauga (CA)

(73) Assignee: Americair Corporation, Mississauga (CA)

( * ) Notice: Subject to any disclaimer, the term of this patent is extended or adjusted under 35 U.S.C. 154(b) by 203 days.

(21) Appl. No.: 17/400,600

(22) Filed: Aug. 12, 2021

(65) Prior Publication Data

US 2022/0047983 A1 Feb. 17, 2022

Related U.S. Application Data

(60) Provisional application No. 63/065,902, filed on Aug. 14, 2020.

(51) Int. Cl.
*B66B 11/02* (2006.01)
*B01D 46/46* (2006.01)
*B01D 46/00* (2022.01)

(52) U.S. Cl.
CPC ......... *B01D 46/46* (2013.01); *B01D 46/0043* (2013.01); *B66B 11/024* (2013.01); *B01D 2273/30* (2013.01); *B01D 2279/50* (2013.01)

(58) Field of Classification Search
CPC ............... B01D 46/46; B01D 46/0043; B01D 2273/30; B01D 2279/50; B66B 11/024
See application file for complete search history.

(56) References Cited

U.S. PATENT DOCUMENTS

| | | | | |
|---|---|---|---|---|
| 5,354,233 | A  * | 10/1994 | Mandy | B66B 11/024 454/343 |
| 9,758,349 | B2 * | 9/2017 | Mandy | F04D 29/701 |
| 10,422,727 | B2 | 9/2019 | Pliskin | |
| 10,875,744 | B1 * | 12/2020 | Doyle | B01D 46/0028 |
| 11,007,464 | B1 * | 5/2021 | Landy | F24F 8/10 |
| 11,629,873 | B2 * | 4/2023 | Lee | B01D 46/4227 96/397 |
| 2018/0311602 | A1 | 11/2018 | Woods et al. | |
| 2020/0188832 | A1 * | 6/2020 | Woods | F24F 13/04 |
| 2021/0354958 | A1 * | 11/2021 | Mandy | B66B 11/024 |
| 2022/0008604 | A1 * | 1/2022 | Vanga, Jr. | B66B 11/024 |
| 2022/0033225 | A1 * | 2/2022 | Wagoner | A61L 9/22 |
| 2022/0047983 | A1 * | 2/2022 | Woods | B01D 46/0043 |

OTHER PUBLICATIONS http://freedom-hvac.com/elevator-modernization, an "elevator car air purification, sterilization and anti-viruses system", printed on Jun. 16, 2021 (1 page); according to "http://web.archive.org/web/2020*/http://freedom-hvac.com/elevator-modernization", this website was "Saved 2 times between May 2, 2020 and May 21, 2020.".
https://www.ashrae.org/technical-resources/frequently-asked-questions-faq, printed on Aug. 11, 2021; 9 pages; according to the "http://web.archive.org/web/*/ttps://www.ashrae.org/technical-resources/frequently-asked-questions-faq", this website was "Saved 43 times between May 4, 2020 and May 27, 2021."

* cited by examiner

*Primary Examiner* — Michael A Riegelman
(74) *Attorney, Agent, or Firm* — ROACH, BROWN, MCCARTHY & GRUBER, P.C.; Kevin D. McCarthy

(57) ABSTRACT

An elevator air filtration system having an elevator car, an outdoor intake HEPA air filtration system that creates HEPA filtered air at a desired temperature, humidity and quantity of filtered outdoor air, and a retractable hose system that delivers the HEPA filtered air to the elevator car.

20 Claims, 6 Drawing Sheets

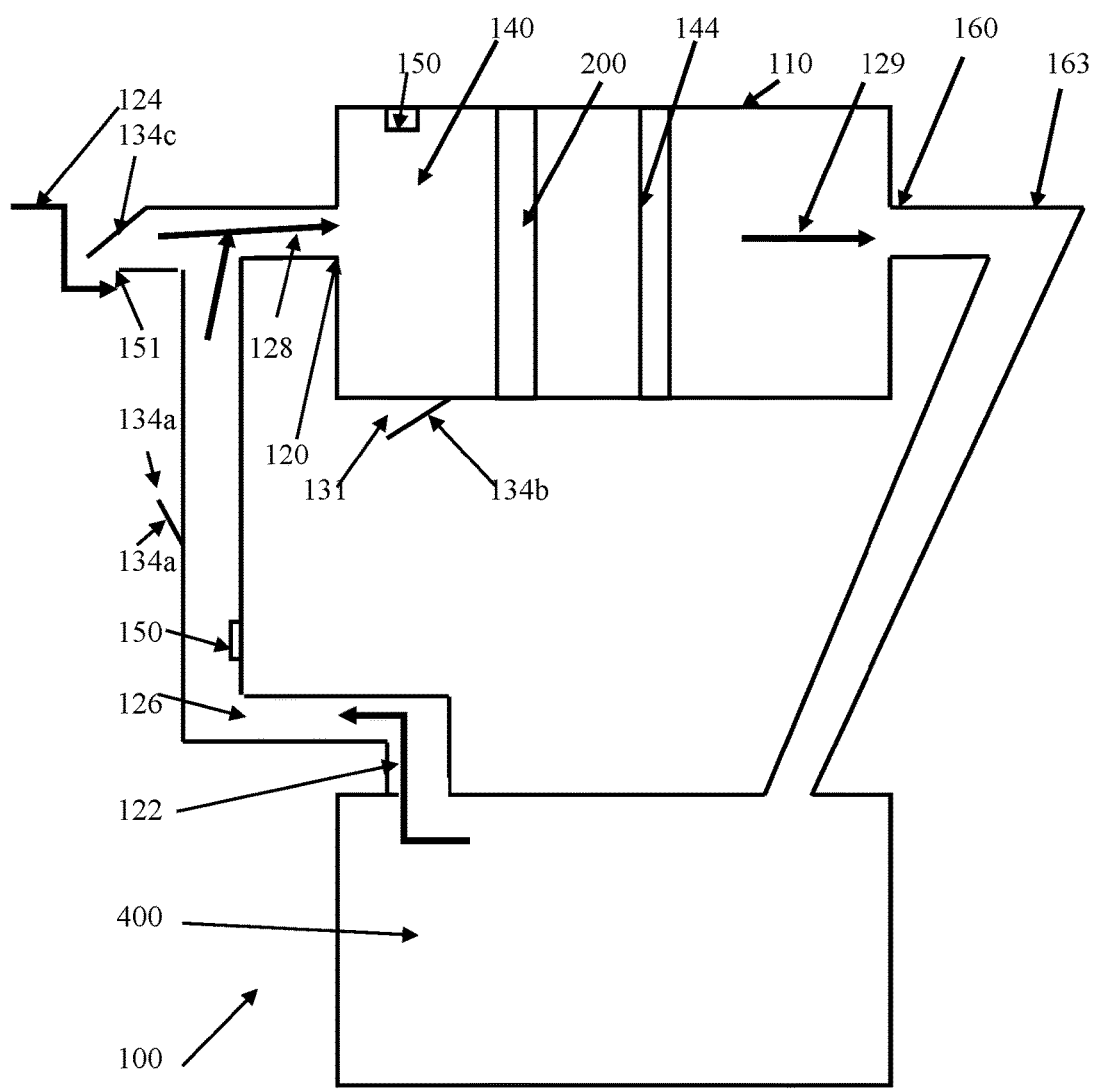
Figure 1 (Prior Art)
Figure 2
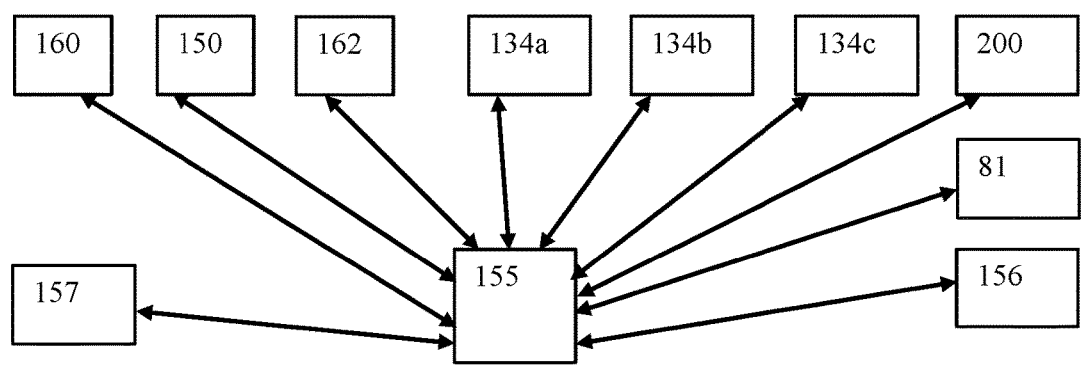

ELEVATORS AND OUTDOOR INTAKE HEPA FILTRATION SYSTEMS

This application claims priority to U.S. provisional application Ser. No. 63/065,902; filed on Aug. 14, 2020.

FIELD OF THE INVENTION

The present disclosure relates to filtering air from moving enclosed spaces, in particular elevator cars, by a high-efficiency particulate air (HEPA) filtration device.

BACKGROUND OF THE INVENTION

There are numerous known methods to circulate air into an elevator.

A first conventional method is to open an elevator door to a lobby area or hallway. That way, some air from the lobby area or hallway can enter the elevator and at least some of the elevator's air can be pushed into the lobby area or hallway.

A second conventional method is to have an elevator shaft have at least one elevator shaft air inlet and at least one elevator shaft air outlet. The elevator shaft air inlet permits outdoor air to enter the elevator shaft and the elevator shaft air outlet permits air from the elevator shaft to exit the elevator shaft. An elevator cab—positioned in the elevator shaft that allows the elevator cab to move or remain stationery in the elevator shaft—has apertures that permit the air in the elevator shaft to enter and exit the elevator cab.

These two conventional methods are not always effective in providing clean, outdoor air. Outdoor air, as defined by ASHRAE, is "ambient air and ambient air that enters a building through ventilation system, through intentional openings for natural ventilation, or by infiltration"; and ambient air is defined as "the air surrounding a building; the source of outdoor air brought into a building"; contaminant is defined as "an unwanted airborne constituent with the potential to reduce acceptability of the air"; and odor is defined as "a quality of gases . . . that stimulate the olfactory organ." The first conventional method does not make sure the air in the lobby and hallway contains HEPA filtered air. Likewise, the second conventional method permits the elevator shaft air (which includes the outdoor air that enters the elevator shaft) to acquire odors from the operating elevator shaft—oil, grease, cable heat, and motor fumes. Obviously, the second conventional method does not make sure the elevator shaft air is HEPA filtered air.

U.S. Pat. No. 10,422,727

As expressed by Pliskin in U.S. Pat. No. 10,422,727; "Approximately 99,000 people die every year from health-care-associated infections and are referred to as hospital-acquired infections, or HAIs. This is due partly to the fact that microbial communities develop in a hospital or other healthcare related facilities. Means to control the spread of microorganisms within hospital or other healthcare related facilities are therefore paramount. How microbial communities persist and change in indoor environments is of immense interest to public health bodies and scientists. Recent studies show that humans alter the microbiome of a space when they begin to occupy that space. The length of time taken to demonstrate a change (e.g., on the carpet of a bedroom) can range from four to six days, suggesting that the rate of succession in a microbial community can be influenced by the way in which the occupants interact with that space. In a hospital setting, continuously admitting and discharging patients from hospital rooms creates a persistent and an ongoing problem. The building materials (e.g., HVAC system, paint, flooring type, etc.) also influence both the rate of succession in communities and the community composition. Contrary to public expectation, the potential for contracting a microbial pathogen is highest within a hospital environment, and these infections are much more likely to be fatal. The Centers for Disease Control and Prevention identified 1.5 million cases of environmentally-contracted identifiable diseases in the United States for 2002, 15,743 of which resulted in death (1%). In comparison, during the same year, estimates of HAIs in the United States was 1.7 million, a rate of 4.5 infections per 100 hospital admissions, which contributed to an astonishing 99,000 deaths (6%). This sobering statistic places HAIs as the sixth leading cause of death, ahead of diabetes, influenza/pneumonia, and Alzheimer's. Also, the cost of extended the stay of a patient due to their contracting an HAI is quite significant. HAIs, also referred to as nosocomial infections, are usually acquired between forty-eight hours and four days after a patient has been admitted to the hospital. Currently, 5% of patients admitted to U.S. medical facilities are affected, with the total number exceeding 1 million people with 1.7 million HAIs requiring 170 million patient days. These infections are normally viral or bacterial in origin, but fungal infections have not been ruled out. The vast majority of these cases occur while the patient is being treated for the ailment that resulted in the hospital admission in the first place. Approximately 36% of these infections could be linked to professional error, through improper attention to protocols for cleanliness in the hospital environment. While these numbers are shocking, they also highlight a considerable lack of evidence regarding both the source and development of nosocomial infections. Microbes reside in many places and the risk of moving waste and soiled linens through hospitals or other healthcare related facilities is real. Aerosolisation happens whenever material, such as soiled linens, is agitated. For example, when waste material is thrown into a room or trash bin, or when soiled linens are thrown down a chute, aerosolisation takes place. This aerosolisation creates risk because microbes (fungi, bacteria, viruses) make up a relatively large percentage of the particulates and can be inhaled by staff, patients, and visitors. In addition, these microbes settle and attach to surfaces and to people. When people leave a room and walk down a hall, or in and out of a patient room, in and out of elevators, and generally mix with others in the facility, by so doing they cause the re-aerosolization of these particulates and microbes throughout the facility. Currently, many man-hours of labor are spent in wiping and cleaning surfaces, but most facilities cannot afford to hire and pay enough workers to properly clean all of these areas on a regular and consistent basis. If a system can clean the air before the microbes settle onto surfaces, a large amount of labor costs can be saved, and if the system can function 24/7, a great improvement in the reduction of HAIs can be achieved."

Plishkan also suggested, "In another embodiment, any of the air filtration systems . . . may be positioned in an elevator, wall, ceiling, or corner mounted, or free standing. Alternatively, the air filtration unit can be mounted on the top, bottom, or side of the elevator cab, space permitting, with the appropriate ducting to draw air into the unit and return it to the interior of the elevator cab." This embodiment is applicable only to a portable air filtration unit positioned in or on the elevator car. The portable air filtration unit does not make sure outdoor air is provided to the elevator car.

The lack of outdoor air in an enclosed location is undesirable because it does not comply with American Society of Heating, Refrigerating, and Air-Conditioning Engineers (ASHRAE) 62.1. ASHRAE 62.1 is considered "The Ventilation Standard for Acceptable Indoor Air Quality" and is a basis for ventilation codes including the International Mechanical Code (IMC). ASHRAE provide expertise and establishes standards in Heating, Ventilation and Air-Conditioning (HVAC) building systems, energy efficiency, indoor air quality, refrigeration, and sustainability. That standard calls for a ventilation unit to provide an enclosed room with at least 17 cubic feet per minute of outdoor air per person. An elevator having a portable HEPA air filtration system is unable to meet that ASHRAE ventilation standard since the portable HEPA air filtration system or portable HVAC system does not handle outdoor air; instead, those systems only handle return air. The claimed invention solves that problem.

Application of Plishkan's Recommendation:

At http://freedom-hvac.com/elevator-modernization, an "elevator car air purification, sterilization and anti-viruses system" is disclosed. The alleged main features of the "elevator . . . anti-viruses system" are "elevator sterilization, air purification, and antiviruses is available; available for nearly all civil elevator cars, such as passenger elevators, medical elevators, and sightseeing elevators, matrix air curtain "isolations" above and within the head area to cut off/block the transmission of viruses caused by breathing, droplets, or aerosols and avoid cross-infection in elevator cars; kill the viruses on the elevator car surface periodically when in unoccupied condition, supplied the elevator cabs with treated outdoor air; with external air conditioning expansion module available; improve indoor air quality (IAQ) in elevator cars, [and] adding values to your property and protect your staff & employees, and tenants." The application of the "elevator . . . anti-viruses system" was described as: "The sterilization will be installed on the elevator car top. Ceiling air supply system (Function is similar to static pressure box) can be designed based on your elevator car sizes and will not affect the valuable elevator car space. The standard thickness is only 130 mm"; "Matrix air curtain "Isolation" to block cross-infection in elevator cabs"; "Super sterilization and full-effect filtration"; "Intelligent control and operation"; and "2 standard sterilization boxes are available to meet your requirements." On that website, it was also asserted that, "The size for our sterilization box (Installed on elevator car top) is roughly 600*390*400 mm, plus the flexible ducts, the total length can be as many as 1000 mm. As most elevator cars are designed with trap-doors/emergency hatches (Size is around 600*400 mm. The ceiling air supply system will be designed to leave space for the trapdoors/emergency hatches) on the elevator car top, there will be limited space available to install the sterilization box. However, as long as there's space to install our sterilization box, you can proceed. Otherwise, this product will not be available for your elevator." Despite those interesting assertions, the website clearly and unequivocally asserts that "The production of this product is stopped forever." Applicant is uncertain why it has stopped production, but one reason may be that the "elevator . . . anti-viruses system" did not circulate outdoor air with the return air. And if other air was mixed with the return air in the HEPA air filtration system positioned on the outside of the elevator car, then the other air was elevator shaft air. Elevator shaft air, as explained above, is industrial air having contaminant odors because of the elevator movement control machinery, the elevator's movements, and the elevator's oil and grease. Industrial air with contaminant odors are therefore undesirable in an enclosed space.

In view of the increased concern about air particulates and contaminants, many entities are promoting devices and methods to (a) cleanse air of particulates and contaminants having a size of 3 microns or greater in elevators and (b) comply with the ASHRAE outdoor air standards. As previously written, an elevator having a portable HEPA air filtration system is unable to meet that ASHRAE ventilation standard since the portable HEPA air filtration system or portable HVAC system does not handle outdoor air; instead, those systems only handle return air. The claimed invention solves that problem.

BRIEF DESCRIPTION OF THE FIGURES

FIG. 1 (prior art) illustrates a conventional HEPA air filtration system interconnected to conventional non-moveable rooms using conduits.

FIG. 2 presents a schematic version of how an electronic control system controls the HEPA air filtration system's fan, doors, intake, output of the present invention.

SUMMARY OF INVENTION

Figure 3:
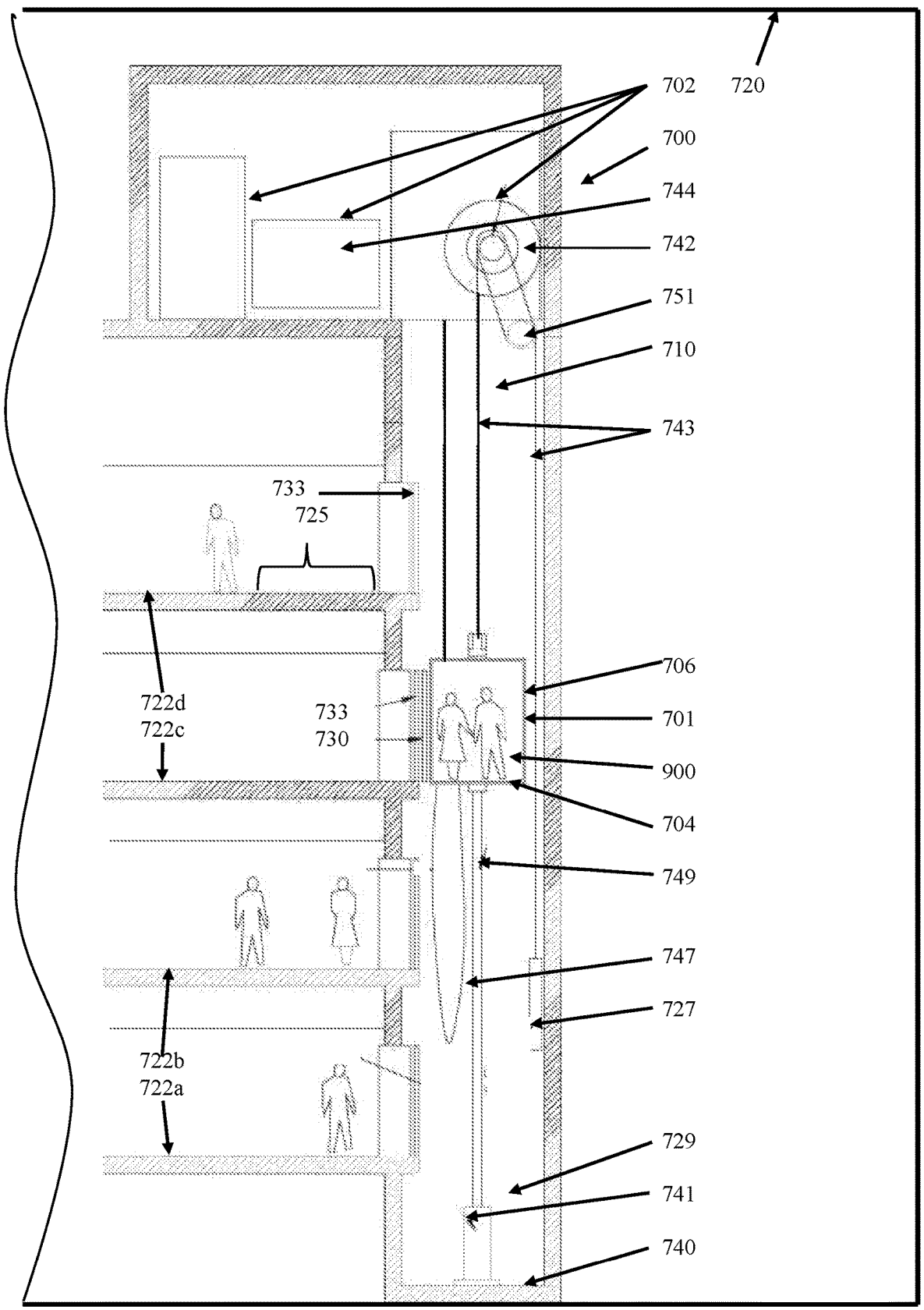
FIG. 3 (prior art) illustrates a conventional elevator system.

An elevator air filtration system having an elevator car, an outdoor intake HEPA air filtration system that creates HEPA filtered air at a desired temperature, humidity and quantity of filtered outdoor air, and a retractable hose system that delivers the HEPA filtered air to the elevator car.

DETAILED DESCRIPTION OF THE INVENTION

HEPA Air Filtration Systems that have Outdoor Intakes

Americair Inc. manufactures HEPA air filtration systems. Its HEPA air filtration systems range from (1) a small air filtration unit that can be positioned in a small-enclosed area that cleans air in, for example, a car, an office room, and an elevator car (as disclosed above); and does not cleanse outdoor air; to (2) an outdoor intake HEPA air filtration unit designed to (a) mix desired amounts of return air from a specific building, specific room(s) in a building, and/or other enclosed spaces with desired amounts of outdoor air (in the claimed invention, outdoor air does not include air obtained from the hoistway since hoistway air has undesirable odors) to meet desired air safety protocols, desired temperatures, desired humidity, and desired air pressure values; (b) HEPA filtering the mixed air, (c) distributing desired amounts of filtered air to the selected non-moving rooms. The outdoor intake HEPA air filtration unit with an outdoor intake can be positioned on a building's roof-top, along the building's side, in the building; or in another adjacent (or close-by) building on the condition that it has an outdoor intake, or combinations thereof (collectively referred to as an "outdoor intake HEPA air filtration system" 100 as shown at FIGS. 1 and 2 (FIG. 2 also illustrates part of the present invention) and cleanses at least outdoor air and in most instances, both outdoor air and return air from the enclosed non-moveable space(s). The building can be, for example and not limited to, a house, a commercial building and/or an industrial building.

Also, when a conventional air handling device (air conditioner, heating system, air circulator, or combinations thereof)—with ductwork—interconnects to or is integrated with a HEPA air filtration unit, then the resulting device can also be referred to as the outdoor intake HEPA air filtration system 100.

The outdoor intake HEPA air filtration system 100 has a HEPA housing unit 110. The HEPA housing unit 110 has an air inlet 120 that receives (a) return air (arrow 122) from an enclosed non-moveable space 400 (normally an office space, storage space, workspace, apartment, or room in a building) and (b) outdoor air (arrow 124). Outdoor air refers to air from an outside or exterior environment that surrounds a building.

The return air 122 is (a) air that was previously located and possibly used in an enclosed non-moveable space like a room, an office, or a hallway (that could have air released from an elevator cab that opened its doors to the hallway) 400; and (b) directed to the air inlet 120. With the outdoor intake HEPA air filtration system 100, the return air is normally directed to the air inlet 120 through return ductwork 126 that channels the return air from the enclosed non-moveable space 400 toward the air inlet 120.

The air inlet 120 receives the return air 122 and outdoor air 124. The air received by the air inlet is commonly referred to as dirty air 128. When the outdoor intake HEPA air filtration system 100 receives both return and outdoor dirty air 128, the outdoor intake HEPA air filtration system can release some (a) return air to the outside environment from a return ductwork's outlet 130 on a conventional return ductwork 126 that is used with non-moving enclosed spaces 400, (b) dirty air in a dirty air chamber outlet 131 of a dirty air chamber 140 that is positioned between the air inlet 120 and a HEPA filter unit 144 in the HEPA housing unit 110, and/or (c) combinations thereof. The return air is released through a first controlled re-sealable door 134a that is positioned at the return ductwork's outlet 130 while the dirty air is released through a second controlled re-sealable door 134b that is positioned at the dirty air chamber outlet 131. The first and second controlled re-sealable door 134a, 134b can release desired amounts of return air 122 and/or dirty air 128 to the outside environment to inhibit over-pressurization of the enclosed space 400. The controlled re-sealable doors 134a, 134b open and close to release a desired quantity of return air 122 and/or dirty air 128 into the outside environment when pressure sensors 150, positioned in the HEPA air filtration system 100, transmit air pressure measurement signals 152 to a HEPA air filtration system's computer 155. At least one of the sealable doors 134a, 134b receives an open signal from the computer 155 when the pressure sensors 150 transmit an air pressure measurement signal that indicates the return air and/or dirty air's air pressure is greater than a desired air pressure to be delivered to the enclosed space 400. Likewise, the sealable doors 134a, 134b close to inhibit any quantity of return air and/or dirty air from being released into the outside environment when the pressure sensors 150 transmit an air pressure measurement signal that indicates the return air and/or dirty air's air pressure is equal or less than a desired air pressure to be delivered to the enclosed space 400. Likewise, there is a third sealable door 134c positioned at an outdoor air inlet 151 that permits the computer to open and close the third sealable door 134c to control whether the outdoor air enters the air inlet 120 or not. One factor in controlling the outdoor air input is whether the HEPA air filtration system 100 can handle the outdoor air's temperature and volume. If the outdoor air's temperature is too warm, the HEPA air filtration system 100 may have difficulty lowering the temperature of the dirty air 128 and/or filtering air 129 to a desired temperature. Likewise, if the outdoor air's temperature is too cold, the HEPA air filtration system 100 may have difficulty raising the temperature of the dirty air 128 and/or filtering air 129 to desired temperature. Hence, the HEPA air filtration system 100 measures the outdoor air's temperature through conventional temperature sensors 160 and velocity through conventional air velocity sensors 162 and transmits those measurements to the computer to calculate whether the HEPA air filtration system 100 can handle the amount of outdoor air at the outdoor air's temperature and volume (volume is a simple equation based on velocity and the cross-sectional area of the outdoor air inlet 151). In reply to those measurements, the computer 155 opens and close the third sealable door 134c according to the outdoor air volume that the HEPA air filtration system 100 can handle in relation to the return air and the desired temperature for the enclosed spaces 400.

The HEPA air filtration system 100, through the computer 155, analyzes
(a) air pressure in the HEPA air filtration system 100 by measuring the air pressure in the return ductworks 126, the housing 110, and the enclosed spaces 400 and/or near the enclosed spaces by air pressure sensors 150 positioned in the return ductworks 126, the housing 110, and the enclosed spaces 400 and/or near the enclosed spaces, and those air pressure sensors transmit those measurements to the computer;
(b) air quantity of return air 122 by measuring the return air's velocity through conventional return air velocity sensors 162 before the return air enters the air inlet 120 to determine if the HEPA air filtration system 100 must release return air 122 to the environment, and the return air velocity sensors transmits the measurements to the computer which knows the cross-sectional area of the return duct 126 at each return air measurement sensor;
(c) air quantity of outdoor air 124 by measuring the outdoor air's velocity through conventional outdoor air velocity sensors 162 at the outdoor air duct 151, and the outdoor air velocity sensors transmits the measurements to the computer which knows the cross-sectional area of the outdoor air duct 151;
(d) temperature of the (i) return air 122 in the return duct 126 by having a first temperature sensor in the return duct 126; (ii) outdoor air outside the HEPA air filtration system 100 by having a second temperature sensor outside the HEPA air filtration system 100; and (iii) dirty air 128 in the dirty air chamber 140 by having a third temperature sensor in the dirty air chamber 140; and each temperature sensor transmits its respective temperature measurement to the computer 155; and/or
(e) relative humidity of the (i) return air 122 in the return duct 126 by having a first relative humidity sensor in the return duct 126; (ii) outdoor air outside the HEPA air filtration system 100 by having a second relative humidity sensor outside the HEPA air filtration system 100; and (iii) dirty air 128 in the dirty air chamber 140 by having a third relative humidity sensor in the dirty air chamber 140; and each relative humidity sensor transmits its respective relative humidity measurement to the computer 155;

and controls the amount of (A) return air 122 that enters the dirty air chamber 140; (B) outdoor air that enters the dirty air chamber 140; (C) dirty air that passes through HEPA filter unit(s) 144 and/or (D) filtered air 129 that can pass through air outlet 160 and in some embodiments to supply ductworks 163. That way, the HEPA air filtration system directs filtered air at a positive pressure to the enclosed space. Examples of how the HEPA air filtration system operates is fully disclosed and incorporated by reference in this application in Americair's US published patent application serial number 20200188832 and 20180311602.

Once the dirty air 128 enters the air inlet 120, the HEPA housing unit 110, in conjunction with a fan 200, directs the dirty air 128 toward the HEPA filter unit 144 and then the HEPA housing air outlet 160. The HEPA air filtration system (which includes the HEPA housing unit) must have the fan (or blower) 200 interconnected to a power source, for example and not limited to a motor or an electrical outlet. The fan moves (a) outdoor air 124 and return air 122 into a mixture identified as dirty air 128, (b) the dirty air toward the HEPA filter unit 144 to form filtered air 129 and (b) drives the filtered air 129 toward the air outlet 160. The fan 200, which is controlled by the computer 155, is also significant in controlling the amount, when, and the rate of (a) return air, outdoor air and dirty air entering the HEPA housing and (b) filtered air that goes to the air outlet 160. The fan 200 can be positioned in (1) the HEPA housing unit, (2) the return ductwork, (3) a supply ductwork 163 or (4) combinations thereof. The fan system pushes or pulls (a) dirty air from the enclosed space(s) (return air) and the outside environment (outdoor air) to the HEPA filter unit and (b) filtered air from the HEPA filter unit to (which may include supply ductwork) the enclosed space(s). The fan draws or pushes the air through (a) the air inlet, (b) a HEPA filter that is laser tested to capture (and thereby remove) 99.97% of the particles in the air stream that enters the HEPA air filtration device down to a size of 0.3 microns—particles of concern that are normally in this size range include and not limited to pollen, household dust, cigarette smoke particulates, bacteria, molds, etc.; or a multi-part HEPA filter having, for example:

(b.1) a pre-filter has a high dust holding capacity that can be made of foam, that removes large air-borne particulates such as dust and dander from the air stream that enters the HEPA air filtration device, (b.2) the HEPA filter that is laser tested to capture (and thereby remove) 99.97% of the particles in the air stream that enters the HEPA air filtration device down to a size of 0.3 microns—particles of concern that are normally in this size range include and not limited to pollen, household dust, cigarette smoke particulates, bacteria, molds, etc.;

(b.3) an inner blanket of activated carbon impregnated with non-woven polyester filter material that absorbs additional gaseous contaminants such as odors and toxic fumes; and (c) the air outlet.

For this application, the above-identified HEPA air filter and the above-identified multi-part HEPA air filter are, in this application, commonly referred to as a HEPA filter unit 144.

The HEPA filter unit 144 is uniquely positioned and sealed in the HEPA housing unit 110 to make sure (a) the dirty air 128 is properly filtered to become filtered air 129 and (b) there is a minimal chance of any dirty air 128 bypassing the HEPA filter unit 144.

In addition to the HEPA filter unit, the HEPA housing unit can have additional filters. Some of those additional filters can include an inlet filter that can be the first of the plurality of filters. The inlet filter can be a biostatic filter that inhibits the growth of fungi and bacteria and helps control microbial odors.

Another additional filter device can be a lining filter that is positioned at and near the air inlet (commonly referred to as the air intake area). The air intake area may be lined with copper or its alloys (brasses, bronzes, cupronickel, copper-nickel-zinc, and others) or silver. The copper, its alloys and silver are natural antimicrobial materials having intrinsic properties that can destroy a wide range of microorganisms. This lining filter can also be positioned throughout the HEPA air filtration system components—in the return ductwork, in other portions of the HEPA housing unit, the supply ductwork, and combinations thereof.

That lining filter and other antimicrobial coatings, such as organosilane coatings, can help to mitigate surface contamination within the HEPA air filtration system.

Another additional filter device can be an ultraviolet germicidal irradiation (UVGI) device may also be incorporated into HEPA air filtration system. UVGI has a deadly effect on micro-organisms, such as pathogens, viruses, and molds. An ultraviolet light source may be introduced into the air flow path before or after the inlet filter, or before or after pre-filter, or before or after HEPA filter.

Elevator

An elevator system 700 (as shown in FIG. 3) contains an elevator car 701—a moving enclosed space—and is a type of cable-assisted, hydraulic cylinder-assisted or roller-track assisted machine that vertically transports people or freight between floors, levels, or decks of a building, vessel, or other structure. They are typically powered by elevator movement control machinery 702—a motor (electric or gas) that drives traction cables and counterweight systems such as a hoist, or a pump hydraulic fluid to raise a cylindrical piston like a jack. There are also elevators that move both vertically and horizontally; those dual-directional elevators that utilize at least two elevator shafts are not applicable to the instant invention. This invention is limited to an elevator car 701 that uses a single elevator shaft.

A modern-day elevator car 701 has a cab 706 mounted on a platform 704 within an enclosed space called a shaft or sometimes a "hoistway" 710.

The elevator hoistway 710 is a shaft constructed to allow elevators to move efficiently between floors 722*a*, 722*b*, 722*e*, 722*d* et al. of a building 720. The shafts 710 are typically constructed so that the elevator car 701 may move smoothly from one floor to the next, while allowing room for the use of ancillary equipment to manage the opening and closing of cab doors 730 and floor doors 733 as the elevator cab 701 reaches a given floor. The construction of a hoistway usually includes ventilation equipment, making it possible for maintenance workers to comfortably correct issues with the equipment used to operate the elevator. That shaft ventilation equipment normally does not cleanse the air of the odor associated with the grease, oil, and grime of an operating elevator car 701. Another common feature of the hoistway is a set of sliding (floor) doors 733 that are found on each floor where the elevator stops. Conventional movement sensors mounted in the shaft signal those floor doors to open as the elevator car arrives at the desired floor.

The parts of an elevator system are spread through the building from top to bottom. A landing 725 is the part of the floor 722a, 722b, 722c, 722d adjacent to the elevator system where passengers and freight are received and discharged. The elevator system's rise or travel is the vertical distance traversed by the elevator car 701 from the lowest to the highest landings.

The car 701 rides up and down in the elevator shaft or hoistway. The hoistway is the vertical space for travel of one or more elevators. There are guide rails 749—vertical steel tracks that control the travel of the elevator car 701—or the counterweight 727—on the side walls of the shaft. Guide shoes on the sides of the car fit onto the guide rails and guide the car vertically in the shaft. An elevator pit 729 is the part of the shaft that extends from the level of the lowest landing to the floor 740 of the hoistway and there can be a buffer 741 on the floor.

The car is lifted in the shaft by cables 743, which connect to a top beam of the elevator system 700. The cables are normally steel wires or flat steel belts that pass over a motor-driven cylindrical sheave 742 at a traction machine 744, then down to the counterweights 727. The hoisting cable 743 is a wire cable or rope used for raising and lowering the elevator car 701. A traveling cable 747 is an electrical cable connecting the elevator car to a fixed electrical outlet in the hoistway.

Counterweights 727 are normally rectangular cast-iron blocks mounted in a steel frame and attached to the other end of the hoisting cable to counterbalance the elevator cab. The counterweight rides in two guide rails on the back wall of the shaft. The weight of the counterweight equals the weight of the car plus an allowance for the people or expected objects in the car. The counterweight creates traction at the sheave and balances the weight of the car. There are also cables attached to the bottom of the car and the counterweight, to balance the weight of the hoist cable.

At the top of the shaft is a structural platform for the elevator movement control machinery 702. A penthouse or elevator machine room on the roof houses the elevator machine that turns the sheave, which lifts or lowers the cab. The penthouse rises one or two levels directly above the shaft. Heavy steel beams support the hoisting machinery. A control panel with switches and buttons regulates the hoisting machine. The drive or motion control governs velocity, acceleration, position determination, and keeping the car level with each floor. A portion of the penthouse or elevator machine room is sometimes referred to as an overhead. The overhead is the area from the top of the upper finished floor to the nearest overhead obstruction within the shaft. This space is required to provide a place for the elevator and its operational machinery when the floor of the cab is level with the upper finished floor.

The elevator normally includes a speed governor to detect excessive speed or freefall and signal brakes to clamp onto guide rails to slow down and stop the elevator car. A limit switch automatically cuts off the current to an electric motor when the elevator passes a point near the top or bottom of its travel. The buffer is a piston or spring device that absorbs the impact of the descending car or counterweight at the extreme lower limit of travel; and is in the elevator pit.

The elevator pit is the depression below the surface of the lowest landing that allows the elevator floor to be level with the floor of the lowest landing. The carriage or sling, which holds the cab, consumes space below the floor of the cab. This means that the material which is below the cab floor must be recessed into the floor to provide proper leveling. The pit depth may need to be increased to provide a safe space under the cab, intended to protect a technician while working under the cab. The pit floor is a critical design element because much of the force imposed by the elevator will be transferred to the pit floor.

The hoistway door between the elevator landing and hoistway is normally closed except when a car is stopped at a landing.

Operating controls for the elevator control the car door operation and the function of car signals. Car signals include floor call buttons and other indicators. Supervisory controls allow group operation of multiple car installations.

It is also well known that an elevator cab 701 is a part of an elevator system 700. A conventional elevator system has the elevator cab 701 positioned in a vertical elevator shaft 710. The cab 701 connects to a counterweight 727 by a plurality of hoisting ropes 743. The hoisting ropes 743 extend over a traction sheave 742 which is driven by a conventional elevator movement control machinery 702 that controls the car's velocity, and a deflector sheave 751. Traction between the traction sheave 742 and the ropes 743 drives the car 701 and the counterweight 727 vertically through the hoistway 710. A governor device inhibits the elevator car 701 from exceeding a maximum speed. For example, the governor device includes a governor rope that travels with the elevator car 701. A governor sheave and a tension sheave can be located at opposite ends of a loop formed by the governor rope. The configuration of the elevator system components may vary from this example in various aspects. In other words, the invention is (a) not necessarily limited to the example vertical elevator system configuration or the specific components of the illustration; and (b) not applicable to elevator systems that move both vertically and horizontally.

A typical modern passenger elevator will have: (a) outside the elevator, buttons to go up or down; (b) space to stand in, (c) overload sensor—prevents the elevator from moving until excess load has been removed; (d) electric fans or air conditioning units to enhance circulation and comfort; and (e) a control panel with various buttons which include call buttons to choose a floor and door open and door close buttons. The elevator may also have an air conditioner and HEPA air cleaner that recirculates the air in the elevator.

The elevator air conditioner unit can provide comfort to the passengers while travelling in the elevator. The elevator air conditioner unit stabilizes the temperature and humidity of the air inside the elevator car. Some elevator air conditioners can be used in countries with cold climates if a thermostat is used to reverse the refrigeration cycle to warm the elevator car. Heat generated from the cooling process of the elevator air conditioner unit is dissipated into the hoistway. The elevator cab is ordinarily not air-tight, and some of this heat may reenter the cab and reduce the overall cooling effect.

The air from a lobby constantly leaks into the elevator shaft due to elevator movements as well as elevator shaft ventilation requirements. Using this conditioned air in the elevator does not significantly increase energy costs. However, by using an independent elevator air conditioner to achieve better temperature and humidity control inside the car, more energy will be used. Air conditioning poses a problem to elevators because of the condensation that occurs. The condensed water produced must be disposed of; otherwise, it could create flooding in the elevator cab and hoistway.

It is understood that there are various elevator systems. A common feature for all various elevator systems is that an elevator cab vertically moves in a shaft. In some embodiments, the elevator is attached to a belt(s) or wire(s) that contacts a sheave. The elevator's movements are controlled by the elevator movement control machinery that controls the sheave, which in turn controls the elevator's position and movements.

Retractable Air Hoses

Figure 4:
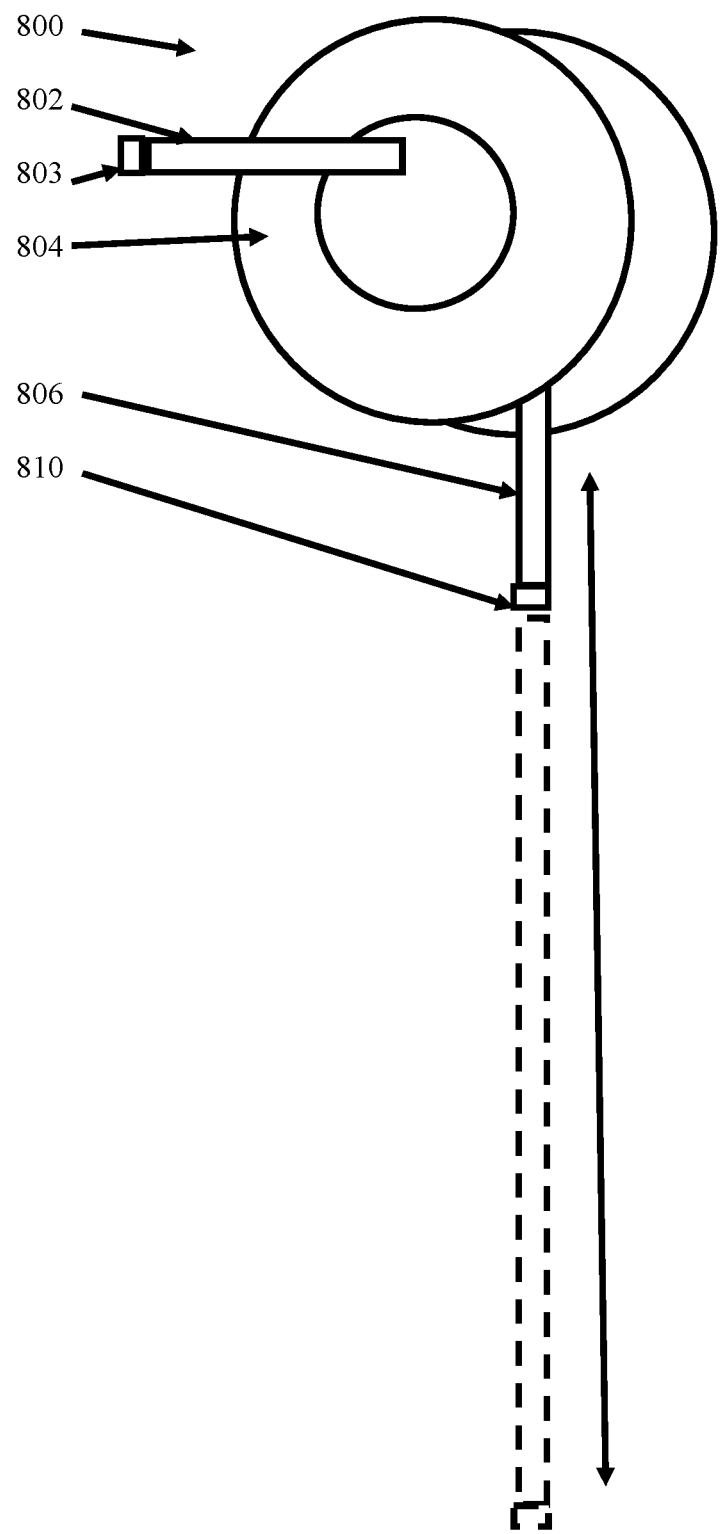
FIG. 4 (prior art) illustrates a conventional spring-loaded, retractable supply hose mechanism operates.

It is understood that spring-loaded, retractable supply hose mechanism 800 (as shown in FIG. 4) used to pan out, retract, and store hoses used for oxygen, gases, breathing treatments or fluids, including intravenous lines are well known. Manufacturers of these spring-loaded, retractable supply hose mechanisms include and are not limited to Tacklife of Birmingham, England; Big E-Z Reel, LLC of Independence, La. Those spring-loaded, retractable supply hose mechanisms have a leader hose 802, a cylindrical reel having a stationary/rotatable conduit 804, and an extending/retracting hose 806 (the dashed lines illustrate for example the extended hose length while the solid lines illustrate for example the retracted hose as exemplified by the double arrow line). The leader hose's proximal end 803 interconnects to a fluid source. The leader hose's distal end interconnects to the stationary/rotatable conduit's proximal, stationary end that is positioned on one of the cylindrical reel's circular plane surfaces. The stationary/rotatable conduit's distal, rotating end that is positioned on cylindrical reel's curved surface interconnects to the extending/retracting hose's proximal end. That permits the remainder of the extending/retracting hose to pan out or retract from the cylindrical reel's curved surface to the desired object; and permits the extending/retracting hose's distal end 810 to interconnect to a desired object.

Modifications

In this invention, the above-identified spring-loaded, retractable supply hose mechanism 800 can be modified to a retractable supply hose mechanism 801 (see FIGS. 6 and 7) so there are two extending/retracting hoses 806 and 806*a* that simultaneously or nearly simultaneously extend and retract with a moveable elevator and moving cables, wires and/or belts. The retractable hose mechanism has a first cylindrical reel curved surface area 880 that contains the first extending/retracting hose 806, wherein the first cylindrical reel curved surface area 880 is interconnected to a second cylindrical reel curved surface area 880*sa* that contains the second extending/retracting hose 806*a*. That way, the first extending/retracting hose 806 and the second extending/retracting hose 806*a* retract and extend at the same time and same rate.

The interconnected first cylindrical reel curved surface area 880—second cylindrical reel curved surface area 880*a* can rotate independently of the motor-driven cylindrical sheave 742 or the elevator movement control machinery. This rotating independently option has caused problems since the first extending/retracting hose 806 and the second extending/retracting hose 806*a* must retract and extend at the same time and same rate as the elevator car 701. This option is not always in synch with the elevator car's 701 movements. This independent rotation embodiment also requires a spring-loaded system that does not always move at the same time and same rate as the motor-driven cylindrical sheave 742 or elevator movement control machinery.

To decrease those potential problems, Applicants recommend the interconnected first cylindrical reel curved surface area 880-second cylindrical reel curved surface area 880*a* rotate in conjunction with the motor-driven cylindrical sheave 742 or other elevator movement control machinery that controls the elevator car's movement. That way, the first extending/retracting hose 806 and the second extending/ retracting hose 806*a* have an increased chance to retract and extend at the same time and rate as the elevator car 701. This preferred embodiment occurs when the interconnected first rotating drum area 880-second rotating drum area 880*a* is connected to the motor-driven cylindrical sheave 742 or elevator movement control machinery through an axle 842 that extends from the motor-driven cylindrical sheave 742 (elevator machinery) through an aperture 844 of the interconnected first cylindrical reel curved surface area 880-second cylindrical reel curved surface area 880*a*. The preferred embodiment ensures the first extending/retracting hose 806 and the second extending/retracting hose 806*a* retract and extend at the same time and same rate that the elevator car 701 moves.

Figure 5:
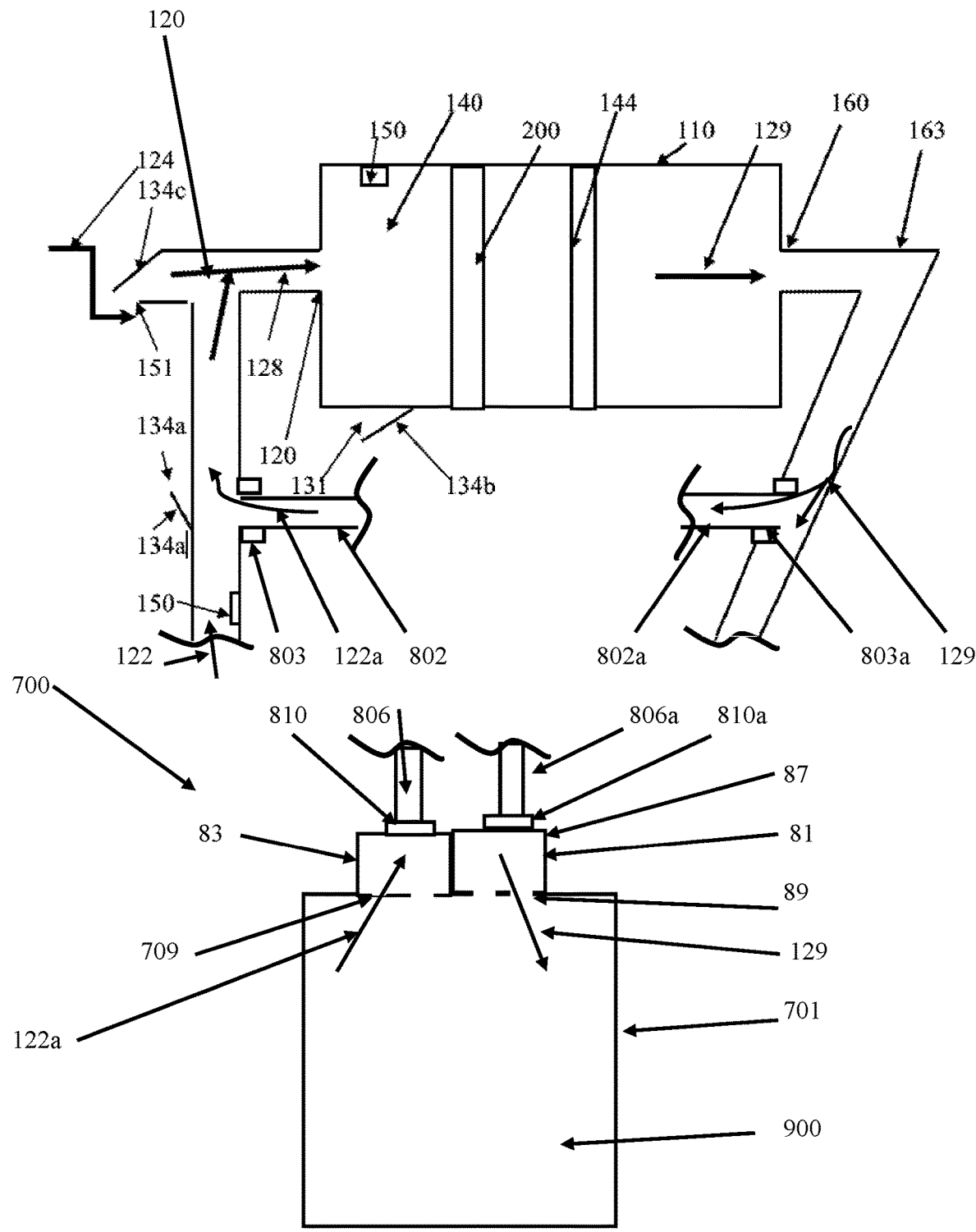
FIG. 5 illustrates a first embodiment of the present invention.

For this invention and turning to FIG. 5, the elevator system 700 also has a vacuum pump system 81 with a return air chamber 83 and a filtered air chamber 87. As illustrated, the vacuum pump system 81 draws return air 122*a* from the elevator car's 701 interior section 900 through at least one return air aperture 709. The return air aperture 709 extends from the interior section 900 to the vacuum pump return air chamber 83. The vacuum pump 81 can be positioned below the platform 704, on one or more car's 706 walls, ceiling, or combinations thereof. The vacuum pump draws the return air from the elevator car's interior section through the at least one return air apertures 709 into the vacuum pump return air chamber 83. Once the return air 122*a* is in the vacuum pump return air chamber 83, the return air 122*a* enters the first extending/retracting hose 806 since the first extending/retracting hose's 806 distal end 810 interconnects to the vacuum pump return air chamber 83. The first leader hose's 802 proximal end 803 interconnects to the air inlet 120 or the return ductwork 126 so the return air 122*a* can enter the dirty air chamber 140 with the outdoor air 124 from the environment and return air 122 that comes from stationary enclosed areas 400.

As expressed above, the dirty air 128 is filtered into filtered air 129. The filtered air 129 is transmitted to the air outlet 160 and into the supply duct 163. The second leader hose's 802*a* proximal end 803*a* interconnects to the air outlet 160, near the air outlet 160 or in the supply duct 163. Meanwhile, the second extending/retracting hose's 806*a* distal end 810*a* interconnects to the vacuum pump's 81 clean air chamber 87. The vacuum pump 81 can create negative pressure in the second leader hose 802*a* and the second extending/retracting hose 806*a* to assist in drawing at least a portion of the filtered air 129 from the HEPA housing, through the hoses 802*a* and 806*a* and into the clean air chamber 87. From the clean air chamber 87, the filtered air 129 passes through at least one supply aperture 89 into the elevator's interior 900. Alternatively, the second extending/ retracting hose 806*a* can be directly interconnected to the at least one supply aperture 89. Obviously, the vacuum pump 81 is interconnects to and communicates with the computer 155 to control the amount of elevator return air that is pulled from and the filtered air that enters the interior section 900 of the elevator car 701. The elevator car 701 can contain the conventional pressure sensors 150, temperature sensors 157, and humidity sensors 156.

Obviously, the vacuum pump system 81 can also be positioned on the interior section 900 so the pump system directs return elevator air into vacuum pump return air chamber 83 and then into the return air aperture 709. The first extending/retracting hose 806 interconnects directly, in this embodiment, with the return air aperture 709. Likewise, the second extending/retracting hose 806a interconnects directly, in this embodiment, with the at least one supply aperture 89.

The filtered air provided to the interior section of the elevator car should be under positive pressure from the fan 200 to make sure there is not a negative pressure environment in the elevator car 701.

Alternatively, the first and second extending/retracting hoses 806, 806a have been intertwined and/or interconnected (see FIG. 7) except for the areas that permit their respective ends to connect to their respective chambers and leader hoses (and rotating conduits) thus only a single cylindrical reel curved surface area 880 can be used. By being intertwined and/or interconnected, there is less chance of the first and second extending/retracting hoses being tangled with other elevator components.

The first and second extending/retracting hoses 806, 806a should have some slack to avoid breaking the hoses interconnections. At the same time the slack should not be enough to cause the first and second extending/retracting hoses to interfere with the elevator equipment and cables.

Figure 6:
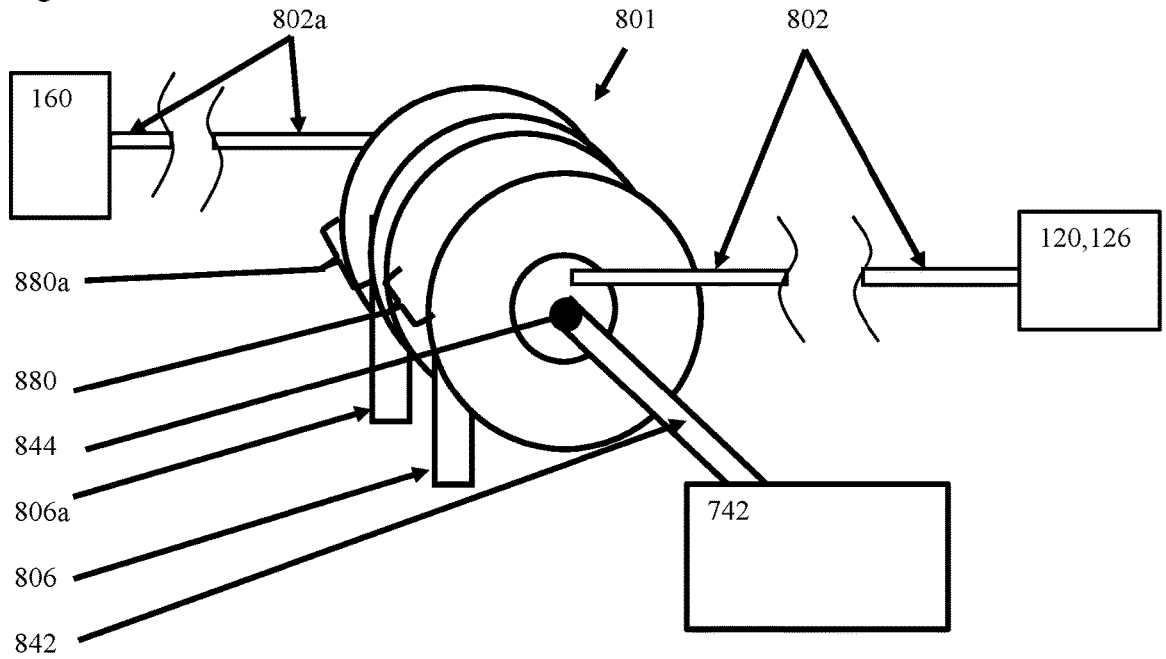
FIG. 6 illustrates a dual retractable supply hose mechanism that works in conjunction with the first embodiment of the present invention.
Figure 7:
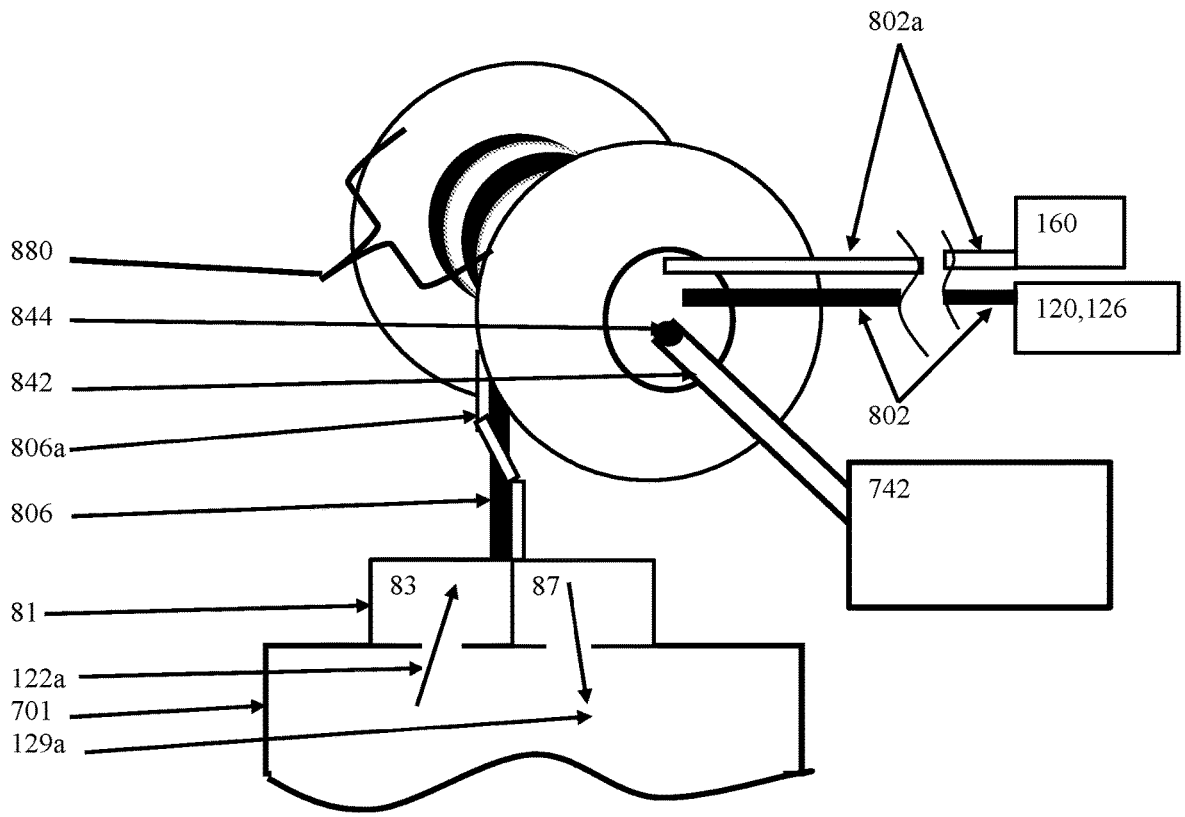
FIG. 7 illustrates a retractable supply dual hose mechanism that works in conjunction with the first embodiment of the present invention.
Figure 8:
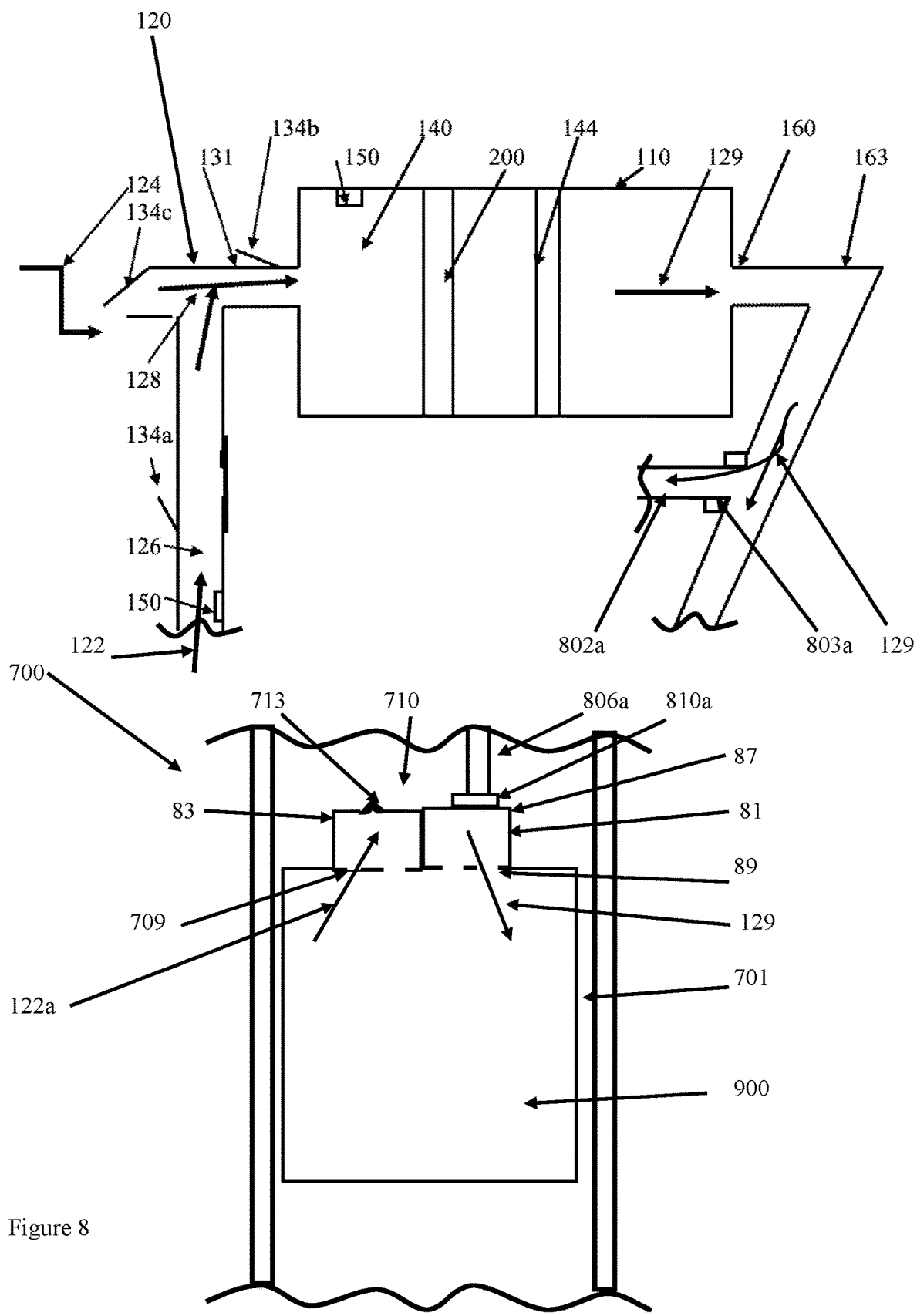
FIG. 8 illustrates a second embodiment of the present invention.

FIG. 8 illustrates an alternative embodiment of FIGS. 5, 6 and 7; wherein there is no (a) first extending/retracting hose 806 interconnected to the return air chamber 83, or (b) first leader hose 802 interconnected to the air inlet 120 or the return ductwork 126 because return chamber 83 has a hoistway one-way valve 713 that permits the return air 122a to exhaust into the hoistway 710.

The above examples and description have of course been provided only for the purpose of illustrations and are not intended to limit the invention in any way. As will be appreciated by the skilled person, the invention can be carried out in a great variety of ways, employing more than one technique from those described above, all without exceeding the scope of the invention.

The invention claimed is:

1. An elevator air filtration system comprising:
(A) an elevator car having
   (A.1) an interior section defined by (a) a platform, (b) a plurality of walls wherein one of the walls has a door that opens and closes to permit at least one person or an object to enter or exit the interior section and (c) a ceiling; and
   (A.2) an exterior section (a) positioned in a hoistway; (b) interconnected to elevator movement control machinery that controls the movement of the elevator car in the hoistway between floors in a multi-story building;
   (A.3) at least one return air aperture that extends from the exterior section to the interior section,
   (A.4) at least one filtered air aperture that extends from the exterior section to the interior section; and
   (A.5) a vacuum pump (i) that pulls air from the elevator car (elevator return air) from the interior section through the at least one return air aperture and (ii) positioned on the exterior section or in the interior section; and
(B) an outdoor intake HEPA air filtration system having an outdoor air inlet, a dirty air chamber, a HEPA air filter, a filtered air chamber and a fan; the fan:
   (B.1) is capable to draw:
      (a) outdoor air surrounding a building into the dirty air chamber through the outdoor air inlet, and
      (b) elevator return air toward the dirty air chamber through an extendable/retractable hose system;
   wherein (i) the elevator return air and outdoor air are directed into the dirty air chamber to form dirty air, and (ii) the extendable/retractable hose system has
      a return air extendable/retractable hose that
         directs elevator return air from the at least one return air aperture toward a return air leader hose, and
         is capable of (i) extending and rolling off from a cylindrical reel when the elevator car moves away from the elevator movement control machinery, and (ii) retracting and rolling onto the cylindrical reel when the elevator car moves toward the elevator movement control machinery,
         the cylindrical reel interconnects to the elevator movement control machinery through an axle so the cylindrical reel (a) rotates in response to the elevator cab's movement and (b) permits the return air extendable/retractable hose to (i) extend and roll off the cylindrical reel and (ii) retract and roll onto the cylindrical reel in response to the elevator cab's movement; and
      the return air leader hose directs the elevator return air from the return air extendable/retractable hose toward the dirty air chamber;
   (B.2) draws or pushes the dirty air through the HEPA air filter into the filtered air chamber, wherein the dirty air that passes through the HEPA air filter becomes filtered air;
   (B.3) draws or pushes the filtered air from the filtered air chamber to the elevator car through a supply extendable/retractable hose system, wherein the supply extendable/retractable hose system has
      a supply air leader hose that directs at least a portion of the filtered air from the filtered air chamber to a supply air extendable/retractable hose; and
      a supply air extendable/retractable hose that
         directs the filtered air from the supply leader hose to the elevator car's interior section through the at least one filtered air aperture, and
         is capable of (i) extending and rolling off from a second cylindrical reel when the elevator car moves away from the elevator movement control machinery and (ii) retracting and rolling onto the second cylindrical reel when the elevator car moves toward the elevator movement control machinery,
         the second cylindrical reel interconnects to the elevator movement control machinery through the axle so the second cylindrical reel (a) rotates in response to the elevator car's movement and (b) permits the supply air extendable/retractable hose to (i) extend and roll off the second cylindrical reel and (ii) retract and roll onto the second cylindrical reel in response to the elevator car's movement.

2. The elevator air filtration system of claim 1, wherein the return leader hose has a return rotating portion and a return stationary portion; the return rotating portion (a) has a distal end capable of interconnecting to the return air extendable/retractable hose's proximal end, (b) has a proximal end interconnects to the return stationary portion's distal end and (c) capable of rotating with the cylindrical reel; the return stationary portion has a proximal end that connects to the outdoor intake HEPA air filtration system so the elevator return air is directed toward the dirty air chamber;

wherein the supply leader hose has a supply rotating portion and a supply stationary portion; the supply rotating portion (a) has a distal end capable of interconnecting to the supply air extendable/retractable hose's proximal end, (b) has a proximal end interconnects to the supply stationary portion's distal end and (c) capable of rotating with the cylindrical reel; the supply stationary portion has a proximal end that connects to the outdoor intake HEPA air filtration system so the filtered air is directed toward the elevator car's interior section through the at least one filtered air aperture.

3. The elevator air filtration system of claim 1, wherein the cylindrical reel and the second cylindrical reel are the same.

4. The elevator air filtration system of claim 1, wherein the return air extendable/retractable hose has (a) a distal end that connects to the elevator car and receives elevator return air that passes through the at least one return air aperture, and (b) a proximal end that connects to the return leader hose;
the supply air extendable/retractable hose has (a) a distal end that connects to the elevator car and directs filtered air toward the at least one supply air aperture, and (b) a proximal end that connects to the return leader hose and
the middle section of the return air extendable/retractable hose and the supply air extendable/retractable hose are interconnected together.

5. The elevator air filtration system of claim 1, wherein the return air extendable/retractable hose has (a) a distal end that connects to the elevator car and receives elevator return air that passes through the at least one return air aperture, and (b) a proximal end that connects to the return leader hose;
the supply air extendable/retractable hose has (a) a distal end that connects to the elevator car and directs filtered air toward the at least one supply air aperture, and (b) a proximal end that connects to the return leader hose and
the middle section of the return air extendable/retractable hose and the supply air extendable/retractable hose are intertwined together.

6. The elevator air filtration system of claim 1, wherein the outdoor intake HEPA air filtration system's fan draws return air from non-moveable enclosed spaces to the dirty air chamber.

7. The elevator air filtration system of claim 1, wherein the outdoor intake HEPA air filtration system's fan draws or pushes filtered air to non-moveable enclosed spaces through at least one supply ductwork.

8. The elevator air filtration system of claim 1, wherein the elevator movement control machinery has a motor that drives a sheave, the sheave has a rope, belt or cable system interconnected to at least one counterweight and the elevator car.

9. The elevator air filtration system of claim 8, wherein the elevator movement control machinery controls the movement of the axle that interconnects the sheave, the cylinder reel, and the second cylinder reel so the sheave, the cylinder reel and the second cylinder reel rotate in the same direction and the same time.

10. The elevator air filtration system of claim 9, wherein the cylindrical reel and the second cylindrical reel are the same.

11. An elevator air filtration system comprising:
(A) an elevator car having
(A.1) an interior section defined by (a) a platform, (b) a plurality of walls wherein one of the walls has a door that opens and closes to permit at least one person or an object to enter or exit the interior section and (c) a ceiling; and
(A.2) an exterior section (a) positioned in a hoistway; (b) interconnected to elevator movement control machinery that controls the movement of the elevator car in the hoistway between floors in a multi-story building;
(A.3) at least one return air aperture that extends from the exterior section to the interior section,
(A.4) at least one filtered air aperture that extends from the exterior section to the interior section; and
(A.5) a vacuum pump (i) that pulls air from the elevator car (elevator return air) from the interior section through the at least one return air aperture and (ii) positioned on the exterior section or in the interior section; and
(B) an outdoor intake HEPA air filtration system having an outdoor air inlet, a dirty air chamber, a HEPA air filter, a filtered air chamber and a fan; the fan:
(B.1) is capable to draw outdoor air surrounding a building into the dirty air chamber through the outdoor air inlet,
(B.2) draws or pushes dirty air through the HEPA air filter into the filtered air chamber, wherein the dirty air that passes through the HEPA air filter becomes filtered air;
(B.3) draws or pushes the filtered air from the filtered air chamber to the elevator car through a supply extendable/retractable hose system, wherein the supply extendable/retractable hose system has
a supply air leader hose that directs at least a portion of the filtered air from the filtered air chamber to a supply air extendable/retractable hose; and
a supply air extendable/retractable hose that
directs the filtered air from the supply leader hose to the elevator car's interior section through the at least one filtered air aperture, and
is capable of (i) extending and rolling off from a second cylindrical reel when the elevator car moves away from the elevator movement control machinery and (ii) retracting and rolling onto the second cylindrical reel when the elevator car moves toward the elevator movement control machinery, the cylindrical reel interconnects to the elevator movement control machinery through the axle so the cylindrical reel (a) rotates in response to the elevator car's movement and (b) permits the supply air extendable/retractable hose to (i) extend and roll off the cylindrical reel and (ii) retract and roll onto the cylindrical reel in response to the elevator car's movement.

12. The elevator air filtration system of claim 11, wherein the supply leader hose has a supply rotating portion and a supply stationary portion; the supply rotating portion (a) has a distal end capable of interconnecting to the supply air extendable/retractable hose's proximal end, (b) has a proximal end interconnects to the supply stationary portion's distal end and (c) capable of rotating with the cylindrical reel; the supply stationary portion has a proximal end that connects to the outdoor intake HEPA air filtration system so the filtered air is directed toward the elevator car's interior section through the at least one filtered air aperture.

13. The elevator air filtration system of claim 11, wherein the supply air extendable/retractable hose interconnects with the at least one filtered air aperture.

14. The elevator air filtration system of claim 11, wherein the supply air extendable/retractable hose interconnects with the vacuum pump, positioned on the exterior section, that directs the filtered air from the supply air extendable/retractable hose into the interior section through the at least one filtered air aperture.

15. The elevator air filtration system of claim 11, wherein the outdoor intake HEPA air filtration system's fan draws return air from non-moveable enclosed spaces to the dirty air chamber.

16. The elevator air filtration system of claim 11, wherein the outdoor intake HEPA air filtration system's fan draws or pushes filtered air to non-moveable enclosed spaces through at least one supply ductwork.

17. The elevator air filtration system of claim 11, wherein the elevator movement control machinery has a motor that drives a sheave, the sheave has a rope, belt or cable system interconnected to at least one counterweight and the elevator car.

18. The elevator air filtration system of claim 17, wherein the elevator movement control machinery controls the movement of the axle that interconnects the sheave, the cylinder reel, and the second cylinder reel so the sheave, the cylinder reel and the second cylinder reel rotate in the same direction and the same time.

19. An elevator air filtration system comprising:
(A) an elevator car having
　(A.1) an interior section defined by (a) a platform, (b) a plurality of walls wherein one of the walls has a door that opens and closes to permit at least one person or an object to enter or exit the interior section and (c) a ceiling; and
　(A.2) an exterior section (a) positioned in a hoistway; (b) interconnected to elevator movement control machinery that controls the movement of the elevator car in the hoistway between floors in a multi-story building;
　(A.3) at least one return air aperture that extends from the exterior section to the interior section,
　(A.4) at least one filtered air aperture that extends from the exterior section to the interior section; and
　(A.5) a vacuum pump (i) that pulls air from the elevator car (elevator return air) from the interior section through the at least one return air aperture and (ii) positioned on the exterior section or in the interior section; and
(B) an outdoor intake HEPA air filtration system having an outdoor air inlet, a dirty air chamber, a HEPA air filter, a filtered air chamber and a fan; the fan:
　(B.1) is capable to draw:
　　(a) outdoor air surrounding a building into the dirty air chamber through the outdoor air inlet,
　　(b) return air from non-moveable enclosed spaces into the dirty air chamber, and
　　(b) elevator return air from the elevator car into the dirty air chamber through an extendable/retractable hose system;
　　wherein (i) the elevator return air, the return air, and outdoor air are directed into the dirty air chamber to form dirty air, and (ii) the extendable/retractable hose system has
　　　a return air extendable/retractable hose that
　　　　directs elevator return air from the at least one return air aperture to a return air leader hose, and
　　　　is capable of (i) extending and rolling off from a cylindrical reel and (ii) retracting and rolling onto the cylindrical reel,
　　　　the cylindrical reel interconnects to the elevator movement control machinery through an axle so the cylindrical reel (a) rotates in response to the elevator cab's movement and (b) permits the return air extendable/retractable hose to (i) extend and roll off the cylindrical reel and (ii) retract and roll onto the cylindrical reel in response to the elevator cab's movement; and
　　　the return air leader hose directs the elevator return air from the return air extendable/retractable hose toward the dirty air chamber;
　(B.2) draws or pushes the dirty air through the HEPA air filter into the filtered air chamber, wherein the dirty air that passes through the HEPA air filter becomes filtered air;
　(B.3) draws or pushes the filtered air from the filtered air chamber to the elevator car through a supply extendable/retractable hose system, wherein the supply extendable/retractable hose system has
　　a supply air leader hose that directs at least a portion of the filtered air from the filtered air chamber to a supply air extendable/retractable hose; and
　　a supply air extendable/retractable hose that
　　　directs the filtered air from the supply leader hose to the elevator car's interior section through the at least one filtered air aperture, and
　　　is capable of (i) extending and rolling off from a second cylindrical reel when the elevator car moves away from the elevator movement control machinery and (ii) retracting and rolling onto the second cylindrical reel when the elevator car moves toward the elevator movement control machinery,
　　　the second cylindrical reel interconnects to the elevator movement control machinery through the axle so the second cylindrical reel (a) rotates in response to the elevator car's movement and (b) permits the supply air extendable/retractable hose to (i) extend and roll off the second cylindrical reel and (ii) retract and roll onto the second cylindrical reel in response to the elevator car's movement.

20. The elevator air filtration system of claim 19, wherein the elevator movement control machinery has a motor that drives a sheave, the sheave has a rope, belt or cable system interconnected to at least one counterweight and the elevator car; and the elevator movement control machinery controls the movement of the axle that interconnects the sheave, the cylinder reel, and the second cylinder reel so the sheave, the cylinder reel and the second cylinder reel rotate in the same direction and the same time.

* * * * *